April 16, 1974 L. W. JOHNSON Re. 27, 970

ROCK CRUSHER

Original Filed Nov. 2, 1961 3 Sheets-Sheet 1

INVENTOR.
LOUIS W. JOHNSON
BY
Buckhorn, Cheatham & Blore
ATTORNEYS

ROCK CRUSHER

Original Filed Nov. 2, 1961 3 Sheets-Sheet 2

INVENTOR.
LOUIS W. JOHNSON
BY
Buckhorn, Cheatham & Blore
ATTORNEYS

ROCK CRUSHER

Original Filed Nov. 2, 1961 3 Sheets-Sheet 3

INVENTOR.
LOUIS W. JOHNSON

BY
BUCKHORN, CHEATHAM & BLORE
ATTORNEYS

United States Patent Office

Re. 27,970
Reissued Apr. 16, 1974

27,970
ROCK CRUSHER

Louis W. Johnson, 3440 Franklin Blvd.,
Eugene, Oreg. 97403

Original No. 3,118,623, dated Jan. 21, 1964, Ser. No. 150,616, Nov. 2, 1961, which is a continuation-in-part of abandoned application Ser. No. 600,791, July 30, 1956. Application for reissue June 11, 1973, Ser. No. 368,594

Int. Cl. B02c 2/06
U.S. Cl. 241—207 20 Claims

Matter enclosed in heavy brackets [ ] appears in the original patent but forms no part of this reissue specification; matter printed in italics indicates the additions made by reissue.

*ABSTRACT OF THE DISCLOSURE*

*A rock crusher includes a head supported on an annular cam by a thrust bearing and a separate single radial bearing having rollers rotatable about vertical axes between the head and the cam. The center of gravity of the head lies within the confines of the roller bearing. A bowl is secured to a frame by a releasable holddown structure including a plurality of cylinders which permit the bowl to tilt upwardly to pass noncrushable material. The holddown structure includes support beams forming a ring and carrying the cylinder units. The bowl includes a bonnet support adjustably mounted on the frame by shims and clamped by a split wedging ring. A self-contained lubrication system includes a pump driven by a drive of the cam member, a sump in the lower part of the frame and an oil passage through the cam from the pump to the bearings.*

This invention relates to crushers and particularly to gyratory rock crushers.

This application contains the subject matter of my prior application (now abandoned) entitled "Rocker Crusher," filed July 30, 1956, Serial No. 600,791 and is a continuation-in-part thereof.

Prior crushers have been objectionable in that the concave or bowl has been held down by a spring system or a crude hydraulic arrangement or had no tramp iron protection at all. When it is desired to increase the pressure on the bowl in those crushers having spring systems, the springs have been tightened down, thus reducing their extent or movement. In some cases the amount of adjustment made has been such that even the smallest noncrushable material entering the crusher would cause the springs to bottom, thus damaging the machine or subjecting the machine to undesirable stresses. Adjustment of the hydraulic systems have proved awkward and time consuming.

It is a main object of the present invention to provide a machine overcoming the just mentioned disadvantages and in particular to provide a machine wherein the pressure with which the bowl is held down may be increased without affecting the extent of relief or release movement of the bowl, and yet wherein a predetermined spaced relation between the bowl and crusher head is maintained during normal crushing operations.

Another object of the invention is to provide an improved crusher of the type having a revolving cam member disposed under a head to tilt the head, and particularly to provide an improved revolving cam member that gives longer bearing life.

In prior crushers the mantle of the crusher head has been secured thereto by bolts threading through the mantle and down into the body of the head. Whenever such bolts have ruptured, their removal has been rendered difficult because they have been broken off in the body of the head.

A further object of the present invention is to provide a squat crusher head including a mantle which is secured to the body of the head in a manner which is simpler than heretofore employed and in which the securing bolt may readily be removed in case of fracture.

Various other objects of the present invention will be apparent from the following description taken in connection with the accompanying drawings, wherein.

Figure 1:
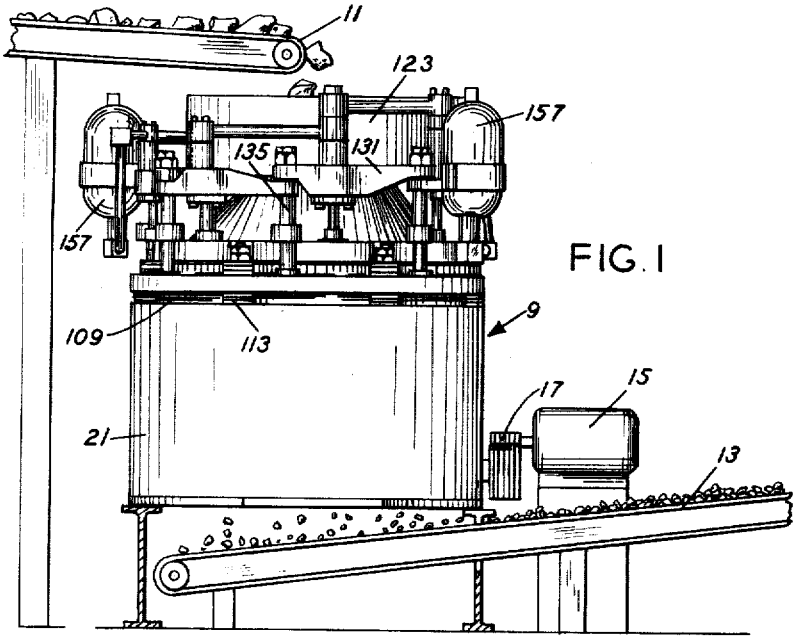
FIG. 1 is a view in elevation of a crusher embodying the concepts of the present invention.

Referring to FIG. 1, the crusher is generally indicated at 9, and reecives rocks to be crushed from a supply conveyor 11. The rocks to be crushed, after passing through the machine, are conveyed away by a suitable discharge conveyor 13. The crusher is driven by a motor 15 through a belt drive 17 in a manner presently to be more fully described.

Figure 2:
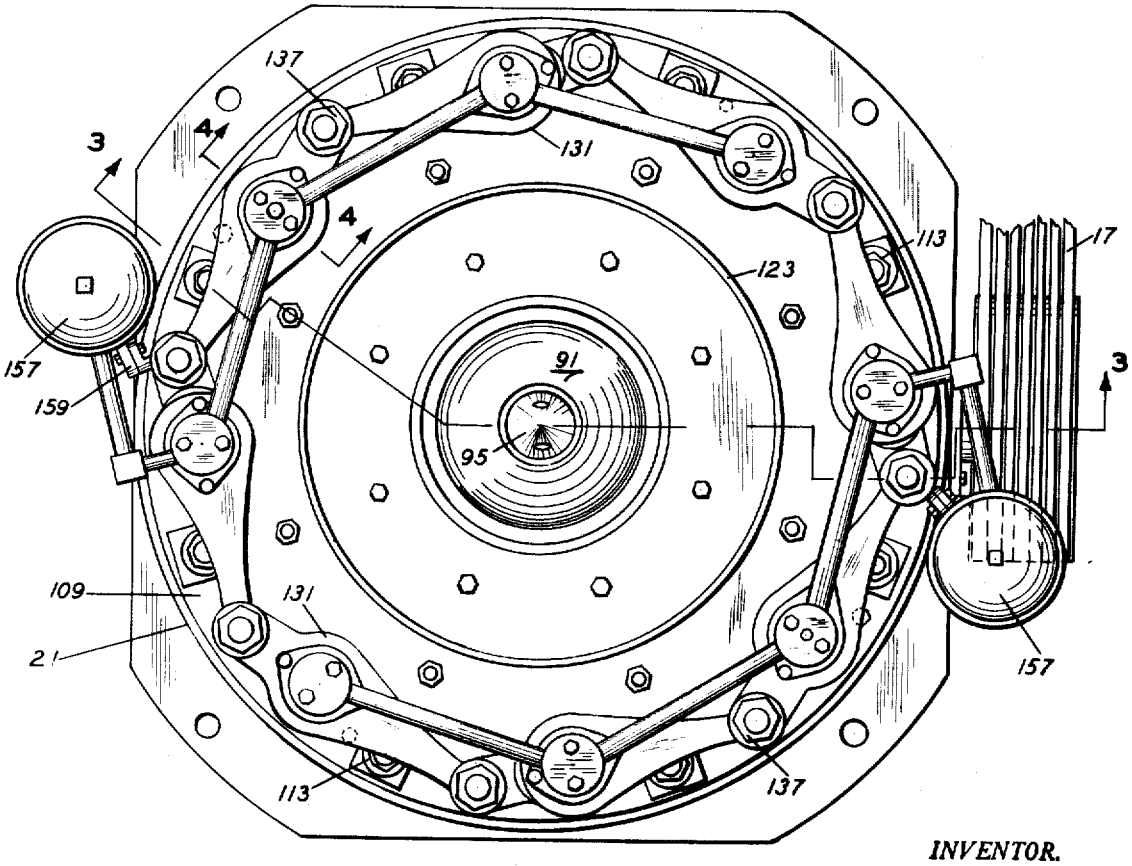
FIG. 2 is an enlarged plan view of the crusher disclosed in FIG. 1.
Figure 3:
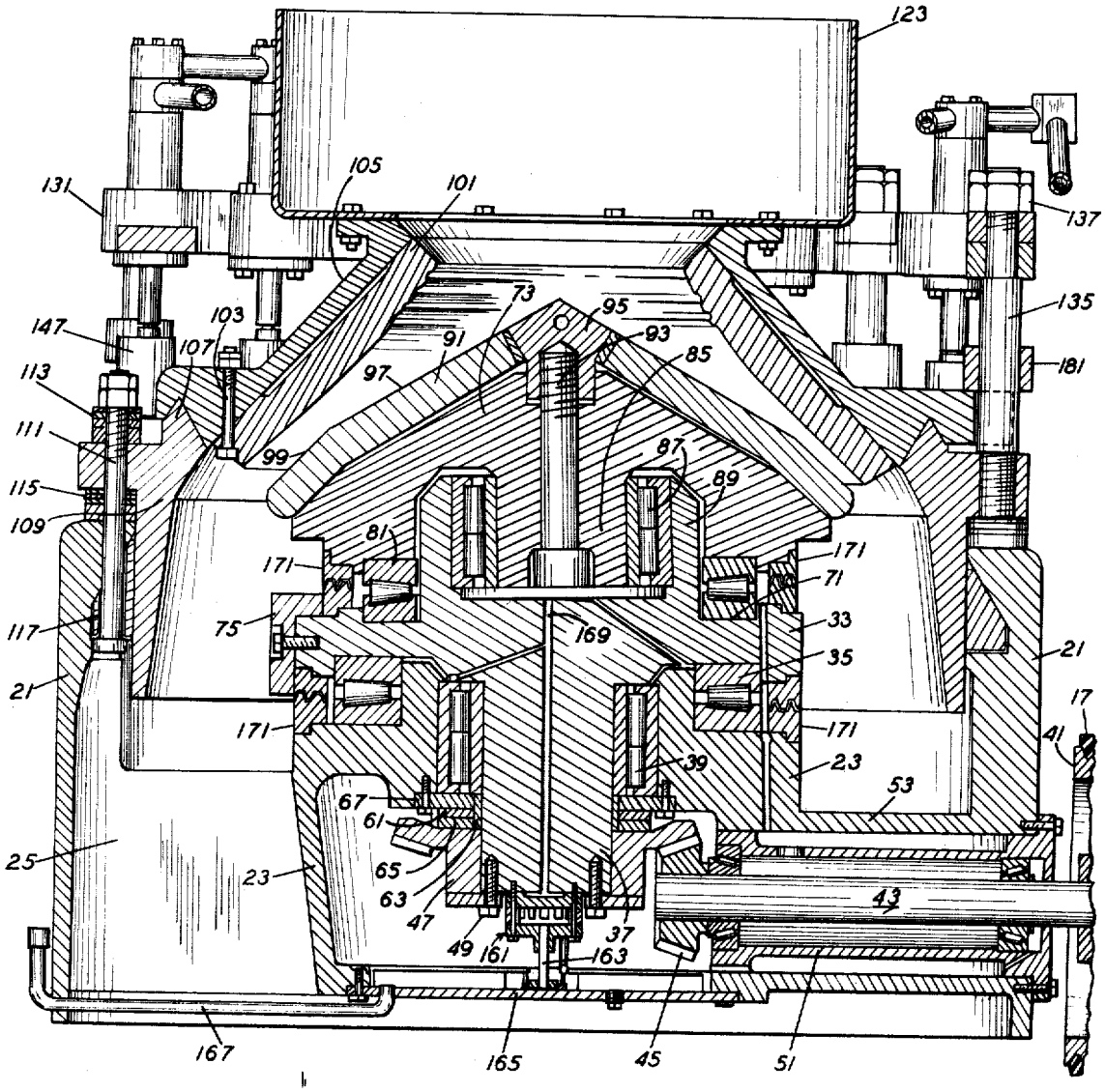
FIG. 3 is a sectional view in elevation taken generally along line 3—3 of FIG. 2, the view being slightly enlarged and showing the internal construction of the crusher.

Referring now particularly to FIG. 3, and incidentally to FIG. 2, the crusher has a frame which includes an outer annular shell 21 and a spaced inner annular shell 23 connected together by a plurality of circumferentially spaced radial ribs 25.

The machine includes a wedge or cam plate 33 supported on inner shell 23 of the frame by an annular thrust bearing 35. The wedge plate has a depending shaft portion 37 between which and the inner shell 23 a roller bearing 39 is arranged. The bearings 35 and 39 are concentrically disposed relative to one another with a center at the center of the shaft portion 37. Thus the lower annular surface 40 of the wedge plate lies in a plane perpendicular to the axis of the shaft portion 37.

The wedge plate 33 is driven from the belt 17 by means of a pulley 41, FIG. 3, secured to a shaft 43 which carries a gear 45 meshing with a gear 47 non-rotatably secured to the lower end of the shaft portion 37 of the wedge plate, such as by keys not shown. A retaining screw and washer unit 49 is provided for the gear. The shaft 43 is journaled in a sleeve 51 which is held within a tubular connecting section 53 between the inner and outer shell portions of the frame of the machine.

A friction type thrust bearing 61 encircles a spacer 63 on the shaft portion 37 and is arranged between a washer 65 and a retaining ring 67 for the bearing 39. The retaining ring is secured to the inner shell 23 of the frame, as shown in FIG. 3.

The wedge plate 33 has an annular cam surface 71 formed on the upper surface thereof, which surface lies in a plane which obliquely intersects the axis of rotation of the wedge plate and is also eccentrically disposed relative to said axis. In fact, this surface is concentric to the geometric axis of the crusher head, generally entitled 73. As will be pointed out hereinafter the geometric axis B of the crusher head and the axis A of rotation of the wedge plate do not coincide at the plane of the cam surface 71 and in fact meet above the apex of the crusher head and diverge downwardly therefrom. Because of this eccentricity of the cam surface, it is apparent that one side, the right-hand side as the parts are shown in FIG. 3, of the wedge plate is thicker than the left-hand side. To counterbalance for this, a counterweight 75 is provided and is secured to the left-hand side of the wedge plate, as shown in FIG. 3.

The crusher head 73 is supported on the surface 71 by a depending annular outer portion engaging an annular anti-friction thrust bearing 81. It is further apparent that the body portion of the crusher head has a depending boss 85 which is encircled by a roller bearing 87 which is received within an upstanding annular flange 89 on the wedge plate 33. It is here pointed out that the flange 89, the bearing 87 and the boss 85 are concentric with each other and with the geometric axis of the head 73. The geometric axis of the head coincides with the axis of rotation of the crusher head.

The crusher head 73 includes a wear plate mantle 91 which is secured by a through bolt 93 and a nut 95 to the body portion of the crusher head. The mantle 91 includes a first frusto-conical portion 97 and a second frusto-conical portion 99, which obliquely intersect one another as shown in FIG. 3.

Arranged above the crusher head and in generally surrounding relation with respect thereto is a bowl which includes an annular frusto-conical liner 101 which is spaced from the head 73 to define a crushing chamber and is secured by bolts 103 to the bonnet or concave 105. The bonnet is concentric to the rotary axis of the wedge plate 33 and has a downwardly facing annular V-shaped groove formed therearound in which cooperatively fits an upstanding annular rim 107 which is part of a bonnet support 109. The bonnet support is of annular configuration and has a depending skirt extending down into the outer shell 21 of the frame of the machine and is secured to the frame by bolts 111. The bolts 111 extend through replaceable spacer means in the form of a plurality of shims 113 and 115 and through wedging means in the form of a sectionalized clamp ring 117 which fits within the shell 21 and has an upwardly and inwardly tapering or inclined surface engaging a complementary surface on the shell so as to tightly engage the skirt of the bonnet support and rigidly hold the bonnet support in position. The bonnet support thus is capable of supporting the bonnet 105, which has a hopper 123 secured to the upper end thereof.

The bonnet and its liner 101 are forcibly but yieldingly held down against the bonnet support 109 by a hydraulic system. The hydraulic system includes a plurality of identical beams 131, FIG. 1, each of which has a relatively thick central portion, as shown in FIG. 1, and relatively thin overlapping end portions. The end portions, instead of being centered on, are offset from the medial line through the central portion of the beam. This makes the beams reversible, and it will be noted that the beams are reversed in alternating fashion around the crusher, as is apparent from FIG. 1. When a beam is disposed so that its end portions are uppermost, the adjacent beams will be disposed with their end portions disposed lowermost. Thus the upper end portions of a beam will overlie the adjacent lower end portions of the adjacent beams. The offset of the end portions of a beam is such that in either position of a beam, the lower surface of the beam will be disposed the same distance from the adjacent socket.

The beams are supported by a plurality of stud bolts 135 which have reduced lower ends threaded into the bonnet support 109, FIG. 3, and have reduced upper ends extending through holes formed in the overlapping ends of adjacent beams 131. Suitable nuts 137 secure the beams in place on the stud bolts 135 and down against the shoulders provided between the reduced upper end portions of the stud bolts and the central portions of such bolts. The bonnet 105 is recessed therearound to accommodate the bolts 135.

Figure 4:
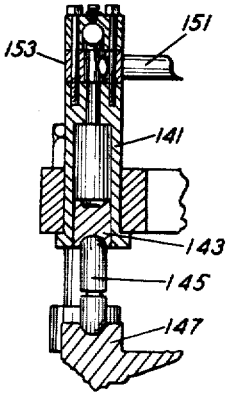
FIG. 4 is a sectional view in elevation taken along line 4—4 of FIG. 2.

Each beam 131 has a through bore, FIG. 4, in the central thickened portion thereof receiving a cylinder 141.

The cylinder has a piston 143 providing a downwardly facing socket receiving the upper rounded end of a thrust pin 145 having a lower rounded end received within a socket formed in a boss 147, FIG. 3, on the bonnet 105.

A suitable manifolding arrangement, including pipes 151, FIG. 4, having hollow end pieces 153 secured to the cylinders 141, is provided for conducting fluid pressure between the cylinders 141 and two accumulators 157 mounted on the beams 131 of the machine by brackets 159.

The machine includes an internal oiling or lubricating system including a pump 161, FIG. 3 of conventional construction, the pump including a rotor contained within a housing, the housing being secured to the wedge plate 33. The rotor has a shaft 163 projecting through the housing and secured in nonrotary relation to a closure plate 165 which closes the lower end of the shell 23 to define an oil reservoir or sump. The reservoir may be filled through the pipe 167. A passageway system including a main passage 169 conducts oil from the pump to the various bearings of the machine. Labyrinth seals 171 prevent the escape of oil from the bearings into the crushing and other rock containing chambers of the machine, and prevents the entry of rock dust, water and other contaminations into the oil passages and system.

Figure 5:
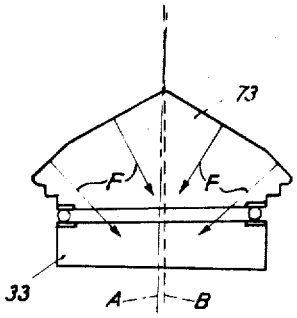
FIG. 5 is a schematic diagram showing the relationship between the crusher head thrust bearing and the crusher head.

The operation of the machine is as follows. Rock falling into the crushing chamber between the crusher head and the liner 101 is crushed by the gyratory action of the head. Referring to FIG. 5, this gyratory action is imparted to the head by the rotary cam surface 71 through the antifriction thrust bearing 81. This bearing is of such size relative to the diameter and conformation of the head that all or substantially all of the resultant lines of crushing force F fall within the supporting surface of this bearing, that is, the upper face of the lower race. Although the downward components of the outermost lines of crushing forces do fall outside of the supporting surface of the thrust bearing, these are effectively counterbalanced by the large number of downward components of the remaining lines of crushing force which do fall within such support surface. The resultants of the lateral and downward forces are resolved as lines of force F at right angles to the surfaces 97 and 99 of the head. Beacuse of the relatively flat rather than peaked form of the upper surface of the head, this means that most of the crushing pressure will be taken by the thrust bearing 81 rather than the radial bearing 87. This is desirable because thrust bearings inherently are capable of taking much greater loads than are radial bearings. It is also pointed out that the center of gravity of the head lies within the length of the bearing 87, threeby eliminating any tilting forces due to the inertial or centrifugal forces of the gyrating head.

Because of the above construction, the long crushed head shaft and plain bearings heretofore required have been eliminated and only a short boss 85 and its anti-friction bearings 87 are required to stabilize the head against the lateral components of the crushing forces. This means that shafts breakage and the resultant operational shutdowns are eliminated. Further, the crusher is more compact in a vertical direction than prior crushers. Still further, the elimination of the long plain bearings means that smaller quantities of lubricating oil are required to maintain the anti-fraction bearings provided at a proper temperature. Thus an internal lubricating system may be provided.

The hydraulic bowl hold-down system of the present invention enables the hold-down pressure to be increased, by increasing the pressure in the accumulators, without decreasing or varying the extent of movement permitted the bowl. When noncrushable material enters the crushing chamber, the bowl may be forced upwardly to raise the pistons 143. Washers 181, FIG. 3, on the bolts 135 limit upward movement of the bowl.

Once the bonnet support 109 is not in its place, it can be considered in effect as part of the frame of the machine. Since the beams 131 are rigidly mounted on the bonnet support, they may also be considered as part of the frame. For convenience, the term frame member may be used to designate the frame proper, and parts rigid with such frame.

Figure 6:
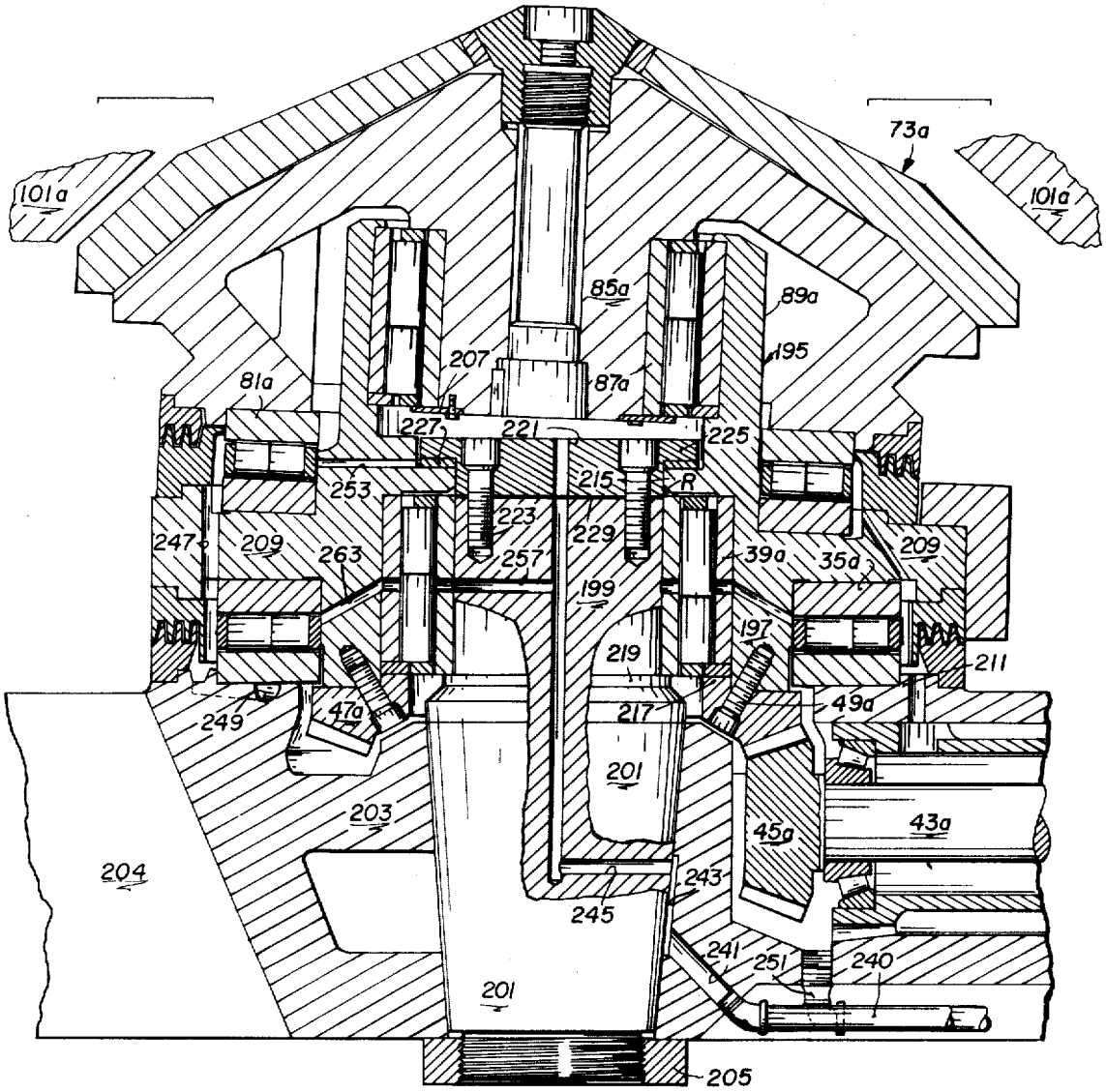
FIG. 6 is a vertical mid-sectional view through a modified form of crusher.
Figure 7:
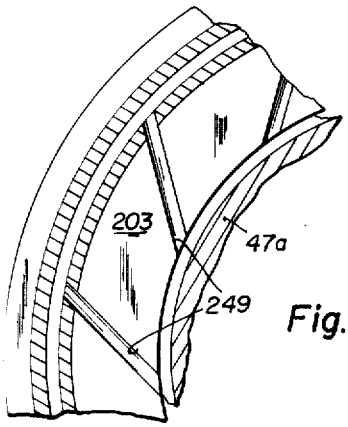
FIG. 7 is a plan view of part of the central frame portion of the machine.

FIGS. 6 and 7 show a modified form of the invention which is similar to the FIG. 3 form by having a squat head 75a cooperating with a bowl line 101a which is releasably held down on the outer shell (not shown) of the main frame of the machine by a hold down system (not shown) but preferably like that in FIG. 1.

While in FIG. 6 there is a radial bearing 87a and a thrust bearing 81a for mounting the head 73a on a revolving cam member, generally indicated at 195, and while the revolving cam member is mounted by a radial bearing 39a and a thrust bearing 35a on the frame of the machine, the revolving member 195 is of different form from the wedge plate 33 of FIG. 3. In FIG. 3 the wedge plate is a solid member having a depending shaft 37 projecting down through the radical bearing 39 and into the inner frame shell 23. In FIG. 6 the revolving member 195 is in the form of a hollow casing which includes a lower tubular portion 197 surrounding the lower radial bearing 39a, and an upper tubular portion 89a surrounding the upper radial beerings 87a.

The lower radial bearing 39a receives the upper end 199 of a stub shaft having a lower tapered portion 201 fitting in a tapered recess formed in the central frame portion 203. The latter is joined to the outer frame shell (not shown) by suitable radial ribs 204. A nut 205 threads on the lower end of the stub shaft and abuts against the central frame portion 203 to draw the stub shaft tightly into place.

The upper radial bearing 87a receives a depending boss 85a on the body of the head 73a. A ring retainer 207 hold the inner race of the bearing 87a against a shoulder provided at the upper end of the boss 85a.

The camming function of the revolving member 195 is performed by an annular wedge portion in the form of an annular flange 209 formed on and projecting outwardly from the lower tubular portion 197 intermediate the length thereof.

The revolving member 195 is supported in a vertical direction by the thrust bearing 35a on the central frame portion 203. The bearing fits in a recess, the interior side wall of which is formed by a circular rib 211 on the central frame portion. The bearing 35a fits around the lower tubular portion 197 of the revolving member 195 and against the lower surface of the annular wedge flange 209. This lower surface is concentric with the lower part of the lower tubular portion 197, with the lower radial bearing 39a and with the stub shaft 201. The plane of the lower surface is perpendicular to the axis of the stub shaft 201. The stub shaft is concentric with the outer shell (not shown) of the frame.

The upper surface of the annular wedge flange 209 not only lies in a plane oblique to the plane of the lower surface but is offset from the lower surface. The upper thrust bearing 81a, which is of smaller diameter than the lower thrust bearing 35a, rests on this upper surface and fits around the central part of the revolving member 195. The radial bearing 87a is concentric with the upper surface of the annular wedge flange 209 and thus the axis of the bearing and of the head 73a is oblique to and intersects the axis of the shaft 201 at a point above the squat head 73a.

The recess defined by the lower tubular portion 197 terminates at an annular shoulder formed by an annular flange 215. The radial bearing 39a is retained in place by a flange 217 on a ring type bevel gear 47a which is secured by bolts 49a to the lower tubular portion 197. A bevel gear 45a on a drive shaft 43a meshes with and drives the ring gear and thus drives the revolving member 195.

The lower part of the upper portion 199 of the stub shaft is defined by a shoulder 219 disposed in contact with the inner race of the radial bearing 39a.

It is pointed out that the tubular portion 89a is counterbalanced on the side thereof closest the axis of the crusher frame by having a 180° bulge at such side. This is evident by comparing the wall thicknesses of the portion 89a in FIG. 6.

A retainer disc 221 is secured by bolts 223 to the upper end of the stub shaft 201 and has a lateral flange 225 overlying the upper face of the annular flange 215 of the revolving cam member 195. A thrust washer 227 loosely fits between the lateral flange 225 and the annular flange 215. One or more shims 229 are provided between the retainer disc 221 and the stub shaft to insure a proper relationship of the thrust washer to the adjacent flanges.

The purpose of the retainer disc 221 is to hold the revolving member 195 in place when the machine is being hauled from place to place. The thrust washer does not take any load when the machine is in operation.

Whereas, in FIG. 3, there is a built-in- pump 61, in FIG. 6 there is an outside pump (not shown) supplying oil under pressure through a conduit 240 to an inlet passage 241 formed in the central frame portion 203. The passage has an annular upper portion 243 communicating with a passage 245 formed in the stub shaft. Passage 245 feeds oil through the disc 221 and to the space above the disc from whence it passes upwardly through the radial bearing 87a and then passes downwardly around the tubular portion 89a and through the thrust bearing 81a. It then travels through downwardly extending passages 247 formed in the annular wedge flange 209 and then inwardly along angled or non-radial grooves 249 (compare FIGS. 6 and 7) into the recesses containing gears 47a and 45a. From these recesses oil exits through an outlet conduit 251.

The revolving cam member 195 is also formed with one or more passages 253 to feed oil from the space above the disc 221 to the upper thrust bearing 81a.

Passage 245 has a horizontal branch passage 257 feeding oil into an annular shaft groove (not apparent from FIG. 6) from whence it flows through the lower radial bearing 39a, appropriate ports being formed in the races of the bearing for this purpose. The oil leaves the bearing by means of an annular groove (not apparent from FIG. 6) in the wedge plate member and flows through passages 263 through the lower thrust bearing 35a to the angular grooves 249.

While it has not been described, appropriate end clearance has been provided for various races of the bearings to insure that both races of a bearing will not have contact with a single member.

One important advantage of the form of the invention shown in FIG. 6 is that the bearing 39a has a rotating inner ring load which gives twice the bearing life as that of the bearing 39 of the first described form of the invention, which has a rotating outer ring load. Another feature of the FIG. 6 form is that the rotating cam member 195 is shorter for the same size crusher than the wedge plate of the first form of the invention, and it is thus easier to hold tolerances on the more compact member.

A still further advantage of the FIG. 6 form of the invention is that for all practical purposes the internal mechanism can be assembled and disassembled from the top. The only parts not assembled from the top are the nut 205 which can be threaded on by reaching under the crusher, and the drive shaft 43a and associated parts which are inserted from the side of the frame. This means that the heavy internal parts may be lowered, such as with a winch, into the crusher frame rather than having to be raised into place, such as by jacks.

Having described the invention in what is considered to be the preferred embodiments thereof, it is desired that it be understood that the invention is not to be limited other than by the provisions of the following claims.

I claim:

1. In a crusher,
a frame,
a crusher head,
a bowl on said frame cooperable with said head to form a crushing chamber,
and means supporting said head for gyratory movement including a cam member rotatable about a vertical axis and supporting said head for rotation about another axis obliquely intersecting said one axis,
said cam member having a cam surface disposed in a plane normal to the axis of rotation of said head,
said cam member having an upwardly projecting annular flange,
said head having a depending portion projecting into said annular flange in space relation with respect thereto,
a thrust bearing between said surface and said head so that said head is caused to gyrate upon rotary movement of said cam member relative to said head,
said thrust bearing being concentric with the axis of said head but eccentric with respect to the axis of said cam,
and radial bearing means in the space between said annular flange and the depending head portion for taking sidewise thrust on said head,
said radial bearing means being concentric with the axis of rotation of said head but eccentric with respect to the axis of said cam member so that the crushing surface of said head moves directly toward and away from the opposed surface of said bowl,
said radial bearing means being disposed not lower than said thrust bearing.

2. In a crusher,
a frame,
a crusher head,
a bowl on said frame cooperable with said head to form a crushing chamber,
and means supporting said head for gyratory movement including a cam member rotatable about one axis and supporting said head for rotation about another axis obliquely intersecting said one axis, said cam member having a cam surface disposed in a plane normal to the axis of rotation of said head,
a thrust bearing having a lower race supported by said surface and an upper race engaging said head so that said head is caused to gyrate upon rotary movement of said cam member relative to said head,
said cam member having an upwardly projecting annular flange,
said bearing having a sufficiently large diameter relative to the size and form of said head such that substantially all lines normal to crushing surface of said head fall within the confines of said bearing,
said head having an integral depending shaft portion,
and radial bearing means having an inner race surrounding said shaft portion and an outer race within and engaging said annular flange of said cam member for taking sidewise thrust on said head,
said radial bearing means being concentric with the axis of rotation of said head and being disposed at a level at least as high as that of said thrust bearing.

3. In a crusher,
a frame,
a crusher head,
a bowl on said frame cooperable with said head to form a crushing chamber,
and means supporting said head for gyratory movement including a cam member rotatable about one axis and supporting said head for rotation about another axis obliquely intersecting said one axis, said cam member having a cam surface disposed in a plane normal to the axis of rotation of said head,
and a thrust bearing between said surface and said head so that said head is caused to gyrate upon rotary movement of said cam member relative to said head,
said head including a depending boss which terminates at approximately the level of said thrust bearing,
and radial bearings between said boss and said cam member to take lateral thrust forces imposed on said head,
said head including a body portion and a mantle on said body portion,
said boss being a part of said body portion,
and a bolt extending through said boss and threadedly received by said mantle to secure said mantle to said body portion.

4. In a crusher,
a frame,
a crusher head,
a bowl on said frame cooperable with said head to form a crushing chamber,
and means supporting said head for gyratory movement including a cam member rotatable about one axis and supporting said head for rotation about another axis obliquely intersecting said one axis,
said cam member having a cam surface disposed in a plane normal to the axis of rotation of said head,
and a thrust bearing between said surface and said head so that said head is caused to gyrate upon rotary movement of said cam member relative to said head,
said crusher having a self-contained lubricating system including a sump formed in the lower part of said frame,
a pump in the sump drive means for driving said cam member and said pump,
and an oil passage circuit extending from said sump to said thrust bearing through said cam member.

5. In a crusher,
a frame,
a head gyratable relative to said frame,
a bowl on said frame cooperable with said head to define a crushing chamber,
and a fluid system holding said bowl against said frame and operable to release said bowl for separating movement relative to said head when noncrushable material of a size greater than said chamber is interposed between said head and bowl,
said fluid system including a plurality of piston and cylinder units uniformly distributed concentrically around said bowl and disposed above portions of said bowl,
the pistons of said units providing downwardly facing sockets and said bowl portions providing opposed upwardly facing sockets,
and a thrust pin for each piston having rounded ends fitting in the socket of the associated piston and in the associated bowl socket to transmit downward forces from said piston to said bowl but permit said bowl to tilt upwardly to pass noncrushable material.

6. In a crusher,
a frame,
a crusher head,
a bowl on said frame cooperable with said head to form a crushing chamber,
[and] means supporting said head for gyratory movement including a cam member rotatable about one axis and supporting said head for rotation about another axis obliquely intersecting said one axis,
said cam member having a cam surface disposed in a plane normal to the axis of rotation of said head,
a thrust *roller* bearing between said surface and said head so that said head is caused to gyrate upon rotary movement of said cam member relative to said head,

*said bearing being designed to take purely thrust forces and having a sufficiently large diameter relative to the size and shape of said head such that substantially all lines normal to the crushing surface of said head fall within the confines of said bearing,* and *a single* radial *roller* bearing [means] between said head and said cam member for taking sidewise thrust on said head, said *single* radial *roller* bearing [means] being concentric with the axis of rotation of said head [,] *and being entirely separate from said thrust roller bearing,*

*said single radial roller bearing having one or more rollers per cage pocket, a common inner race and a common outer race,* the center of gravity of said head lying within the confines of said *single* radial *roller* bearing [means] so that centrifugal and inertia forces imparted to said *single* radial *roller* bearing [means] by said head during gyration thereof [do not tend] *have a lesser tendency* to tilt said head relative to said *single* radial *roller* bearing [means].

7. In a crusher, a frame, a crusher head, a bowl on said frame cooperable with said head to define a crushing chamber, a releasable hold-down arrangement for said bowl including support means in the form of a plurality of identical beams forming a ring concentric with said bowl but disposed above the periphery of said bowl, each beam having a central portion thicker than its end portions and unsymmetrically disposed relative to such end portions, alternate beams being disposed in inverted relationship with respect to the remaining beams so that the lower surfaces of the central portions of the beams are disposed at approximately the same level, piston and cylinder means carried by said beams, and similar thrust means between the piston and cylinder means and said bowl.

8. In a crusher, a frame, a crusher head, a bowl on said frame cooperable with said head to define a crushing chamber, a releasable hold-down arrangement for said bowl including support means in the form of a plurality of separate beams forming a ring concentric with said bowl but disposed above the periphery thereof, spacer means releasably supporting said beams on said frame to permit removal of some of said beams without disturbing the remainder, piston and cylinder means carried by each beam, thrust means extending between each piston and cylinder means and said bowl, and separate conduit members interconnecting said piston and cylinder means, and means releasably fastening said conduit members in place permitting some to be removed without disturbing the remainder.

9. In a crusher, a frame, said frame having an annular wall, a bonnet support having an annular portion projecting downwardly into said annular wall and an annular portion overlying the top of such wall, wedging means between the annular portion and said annular wall, means for clamping said bonnet support downwardly against said frame and for causing said wedging means to become wedged between said annular portion and said annular wall to prevent side shifting of said bonnet support relative to said frame, a bonnet unit on said bonnet support and movable upwardly with respect to said bonnet support to pass non-crushable material, and a crusher head within said frame and adjacent said bonnet unit.

10. A crusher as set forth in claim 9, in which the means for clamping said bonnet support includes a series of bolts extending upwardly through said wedging means and said frame and said bonnet support, and wherein there are replaceable spacer means disposed between said bonnet support and said frame and through which said bolts pass.

11. In a crusher, a frame, said frame having an annular wall, a bonnet support having an annular portion projecting downwardly into said annular wall and an annular portion overlying the top of such wall, wedging means between the annular portion and said annular wall, means for clamping said bonnet support downwardly against said frame and for causing said wedging means to become wedged between said annular portion and said annular wall to prevent side shifting of said bonnet support relative to said frame, a bonnet unit on said bonnet support and movable upwardly with respect to said bonnet support to pass non-crushable material, and a crusher head within said frame and adjacent said bonnet unit and a releasable hold-down assembly for said bonnet unit, said hold-down assembly being carried by said bonnet support so that said bonnet unit together with said assembly may be removed as a unit leaving the interior of said frame and said head exposed for repair work.

12. In a crusher, a frame, a crusher head, a bowl disposed in surrounding relation with respect to said head to form a crushing chamber, means supporting said head for gyratory movement including a cam member supported for rotation about a vertical axis, said cam member having an upwardly facing generally horizontal annular cam surface, said head being supported in a vertical direction by said cam surface and being mounted on said cam member and solely supported thereby, *said supporting means including a thrust roller bearing positioned on said cam surface and disposed between said cam member and said head and supporting said head vertically* for rotation about a second aixs, [that is] *said second axis being* oblique with respect to said vertical axis and [diverges] *diverging* downwardly with respect to said vertical axis from a level at least as high as the highest place on said head that cooperates with said bowl in a crushing operation.

*said supporting means also including radial antifriction bearing means mounting said head rotatably on said cam member,*

*said radial antifriction bearing means consisting of a single radial roller bearing,* said annular cam surface being concentric with the head axis and eccentric with respect to the cam member axis and surrounds both, said cam surface being obliquely disposed relative to said [cam member] *vertical* axis, [the support of said head by said cam member being by antifriction bearings,]

said cam member having an annular portion located outside of said bearings and underlying an annular portion of said crusher head, and labyrinth seal means carried by said annular portions, said labyrinth seal means being automatically separable upon separation of said cam member and said head.

13. In a crusher,
a frame,
a crusher head,
a bowl disposed in surrounding relation with respect to said head to form a crushing chamber,
means supporting said head for gyratory movement including a cam member under said head,
said cam member being supported for rotation about a vertical axis,
said head being mounted on said member and solely supported thereby for rotation about a second axis that is oblique with respect to said vertical axis and diverges downwardly with respect to said vertical axis and intersects said vertical axis at a level above said head,
said cam member having an annular cam surface which is concentric with the head axis and eccentric with respect to the cam member axis and surrounds both,
said cam surface being a planar surface lying in a plane which is normal to said head axis,
said head being of squat form,
said supporting means further including bearing means between said head and cam member for taking both lateral and vertical thrust forces between said head and cam member,
said bearing means being located above said cam surface,
said bearing means including a thrust bearing having rollers rotatable about horizontal axes and a separate *single* radial bearing having rollers rotatable about vertical axes[.],
*said head being of squat form to distribute lines of crushing force across said thrust bearing.*

14. In a crusher,
a frame,
a crusher head,
a bowl disposed in surrounding relation with respect to said head to form a crushing chamber,
means supporting said head for gyratory movement including a cam member supported for rotation about a vertical axis,
said head being mounted on said cam member and solely supported thereby for rotation about a second axis that is oblique with respect to said vertical axis and diverges downwardly with respect to said vertical axis from a level at least as high as the highest place on said head that cooperates with said bowl in a crushing operation,
said cam member having an annular cam surface which is concentric with the head axis and eccentric with respect to the cam member axis and surrounds both,
said cam surface being obliquely disposed relative to said cam member axis,
said head being of squat form,
said supporting means further including antifriction bearing means having an upper race bearing against said head and a lower race bearing against and supported by said cam member for taking vertical thrust forces and other antifriction bearing means having an inner race bearing against a portion of said head and an outer race bearing against and supported by said cam member for taking horizontal thrust forces,
both of the just-mentioned bearing means being concentric with the axis of said head,
still other bearing means between said cam member and said frame for taking vertical thrust forces on said cam member,
said still other bearing means being concentric with the axis of said cam member and having a diameter larger than said other bearing means to take vertical thrust forces imposed on said cam member by said other bearing means despite the eccentricity of said other bearing means relative to the axis of rotation of said cam member.

15. In a rock crusher having a frame supporting a bowl next to a crusher head,
means for supporting and tilting said head comprising:
an upright hollow casing having obliquely related upwardly and downwardly facing surfaces,
a thrust bearing between said downwardly facing surface and said frame,
a lower radial bearing within said casing and surrounding an upwardly projecting extension of said frame,
a thrust bearing between said upwardly facing surface said said head,
and an upper radial bearing within said casing and surrounding a downwardly projecting extension on said head.

16. In a rock crusher having a frame supporting a bowl next to a crusher head,
means for supporting and tilting said head comprising:
an upright hollow casing having obliquely related upwardly and downwardly facing surfaces,
a thrust bearing between said downwardly facing surface and said frame,
a lower radial bearing within said casing and surrounding an extension of said frame,
a thrust bearing between said upwardy facing surface and said head,
and an upper radial bearing within said casing and surrounding an extension on said head, said surfaces being provided by an exterior annular flange located intermediate the vertical ends of said casing.

17. In a rock crusher having a frame supporting a bowl next to a crusher head,
means for supporting and tilting said head comprising:
an upright hollow casing having obliquely related upwardly and downwardly facing surfaces,
a thrust bearing between said downwardly facing surface and said frame,
a lower radial bearing within said casing and surrounding an extension of said frame,
a thrust bearing between said upwardly facing surface and said head,
and an upper radial bearing within said casing and surrounding an extension on said head, said surfaces being provided by an exterior annular flange located intermediate the vertical ends of said casing, said flange being disposed below the level of the upper end of said lower radial bearing.

18. In a crusher,
frame means,
a head gyratable within said frame means,
a bowl above said head and against which material may be crushed,
said bowl resting on said frame means,
means for releasably holding said bowl against said frame means,
said releasable means including a plurality of extensible assemblies operatively interposed between said bowl and frame means,
each extensible assembly including vertically spaced rockable joints at the opposite ends of a thrust pin means which is held in compression between the frame means and bowl,
each assembly also including piston and cylinder means extensible to effect a separating force on said assembly and a compressive force on said thrust pin means,
each joint including a socket on one part engaged by a rounded end on an adjacent part.

19. In a crusher,
a frame member,
a head gyratable within said frame member,
a bowl member above said head and against which material may be crushed,
said bowl member resting on said frame member, means for releasably holding said bowl member down against said frame member, said releasable means including a plurality of extensible assemblies operatively interposed between said bowl member and frame member and distributed about said bowl member and frame member, each extensible assembly including a piston and cylinder, one of said members having two vertically spaced portions between which a portion of said other member is disposed, said portion of said other member and one of said two portions being disposed in abutting relationship, wherein in such abutting relationship, the portion belonging to the bowl member is uppermost, said extensible assemblies engaging and being operatively disposed between said portion of said other member and the other of said two portions and being vertically extensible under fluid pressure to force said portion of said other member and said one of said two portions into tight engagement, said extensible assemblies, including pneumatic fluid which can be compressed when a non-crushable object enters said crusher and assumes a position between said head and said bowl member, to enable said bowl member to tilt upwardly at the location of said object, said extensible assemblies accommodating the lateral movement of the tilted portion of said bowl member which accompanies its tilting movement.

*20. In a crusher,*

*a frame,*

*a crusher head,*

*a bowl on said frame cooperable with said head to form a crushing chamber,*

*means supporting said head for gyratory movement including a cam member rotatable about one axis and supporting said head for rotation about another axis obliquely intersecting said one axis,*

*bearing means supporting said cam member for rotation about said one axis and including a single radial roller bearing for taking the entire radial bearing load on said cam member,*

*said cam member having a cam surface disposed in a plane normal to the axis of rotation of said head,*

*a thrust roller bearing between said surface and said head so that said head is caused to gyrate upon rotary movement of said cam member relative to said head,*

*and a single radial roller bearing between said head and said cam member for taking sidewise thrust on said head,*

*said last mentioned single radial roller bearing being concentric with the axis of rotation of said head and being entirely separate from said thrust roller bearing,*

*each of said single radial roller bearings having one or more rollers per cage pocket, a common inner race and a common outer race,*

*the center of gravity of said head ying within the confines of said single radial roller bearing between said head and said cam member so that centrifugal and inertia forces imparted to said last-mentioned single radial roller bearing by said head during gyration thereof have a lesser tendency to tilt said head relative to said last-mentioned single radial roller bearing.*

References Cited

The following references, cited by the Examiner, are of record in the patented file of this patent or the original patent.

UNITED STATES PATENTS

| | | | |
|---|---|---|---|
| 1,083,283 | 1/1914 | Kelly | 241—207 |
| 1,507,970 | 9/1924 | Lazier | 241—215 X |
| 2,579,238 | 12/1951 | Lippmann | 241—215 |
| 2,667,309 | 1/1954 | Becker | 241—231 X |
| 2,679,984 | 6/1954 | Gruender | 241—215 |
| 2,680,571 | 6/1954 | Bjarme | 241—290 |
| 2,713,461 | 7/1955 | Kjelgaard | 241—208 |
| 2,787,425 | 4/1957 | Gruender | 241—290 |
| 2,791,383 | 5/1957 | Kjelgaard | 241—207 |
| 2,829,842 | 4/1958 | Messinger | 241—208 |
| 2,901,189 | 8/1959 | Conway | 241—207 |
| 2,144,145 | 1/1939 | Daniel | 241—175 X |

OTHER REFERENCES

| | | | |
|---|---|---|---|
| 1,069,105 | 2/1954 | France | 241—208 |

GRANVILLE Y. CUSTER, JR., Primary Examiner

H. N. GOLDBERG, Assistant Examiner

U.S. Cl. X.R.

241—202, 290

UNITED STATES PATENT OFFICE

CERTIFICATE OF CORRECTION

Patent No. Reissue 27,970 Dated April 16, 1974

Inventor(s) LOUIS W. JOHNSON

It is certified that error appears in the above-identified patent and that said Letters Patent are hereby corrected as shown below:

Column 14, additional references cited:

1,993,900 Rumpel
2,590,795 Rumpel
2,634,061 Rumpel
2,881,981 Rumpel

Column 2, line 27, "reecives" should be --receives--.
Column 4, line 39, "large" should be --larger--.
Column 4, line 41, "support" should be --supporting--.
Column 4, line 43, "beacuse" should be --because--.
Column 4, line 51, "threeby" should be --thereby--.
Column 4, line 53, "crushed" should be --crusher--.
Column 4, line 58, "shafts" should be --shaft--.
Column 5, line 8, "75a" should be --73a--.
Column 5, line 25, "beerings" should be --bearing --.
Column 5, line 36, "hold" should be --holds--.
Column 6, line 21, "built-in-pump 61" should be --built-in pump 161--.
Column 7, line 56, after "to" insert --the--.
Column 12, line 12, "said said" should be --and said--.
Column 14, line 13, "ying" should be --lying--.

Signed and sealed this 15th day of October 1974.

(SEAL)
Attest:

McCOY M. GIBSON JR.
Attesting Officer

C. MARSHALL DANN
Commissioner of Patents